US008110632B2

(12) United States Patent
Lietzau et al.

(10) Patent No.: US 8,110,632 B2
(45) Date of Patent: Feb. 7, 2012

(54) POLY(ARYLENE ETHER) ARTICLES AND COMPOSITIONS

(75) Inventors: Christian Lietzau, Delmar, NY (US); Vijay R. Mhetar, Westfield, IN (US); Abhijit Namjoshi, Slingerlands, NY (US); Geuch Zijlma, Goes (NL)

(73) Assignee: Sabic Innovative Plastics IP B.V. (NL)

( * ) Notice: Subject to any disclaimer, the term of this patent is extended or adjusted under 35 U.S.C. 154(b) by 325 days.

(21) Appl. No.: 12/353,995

(22) Filed: Jan. 15, 2009

(65) Prior Publication Data

US 2010/0179290 A1 Jul. 15, 2010

(51) Int. Cl.
*C08J 5/00* (2006.01)
*C08L 25/06* (2006.01)
*C08L 53/02* (2006.01)

(52) U.S. Cl. ............. 525/88; 525/92 R; 525/89; 525/93; 525/98

(58) Field of Classification Search .................... 525/88, 525/92 R, 89, 93, 98
See application file for complete search history.

(56) References Cited

U.S. PATENT DOCUMENTS

| | | | |
|---|---|---|---|
| 3,375,228 | A | 3/1968 | Holoch et al. |
| 4,048,143 | A | 9/1977 | Hay et al. |
| 4,254,775 | A | 3/1981 | Langer |
| 4,654,405 | A | 3/1987 | Jalbert et al. |
| 4,760,118 | A | 7/1988 | White et al. |
| 5,106,696 | A | 4/1992 | Chundury et al. |
| 5,122,575 | A | 6/1992 | White et al. |
| 5,258,455 | A | 11/1993 | Laughner et al. |
| 5,468,530 | A | 11/1995 | Gotz et al. |
| 5,629,062 | A | 5/1997 | Ejiri et al. |
| 6,306,978 | B1 | 10/2001 | Braat et al. |
| 6,352,782 | B2 | 3/2002 | Yeager et al. |
| 6,357,802 | B1 | 3/2002 | Nozato et al. |
| 6,627,704 | B2 | 9/2003 | Yeager et al. |
| 6,727,297 | B2 | 4/2004 | Geprags et al. |
| 6,743,846 | B2 | 6/2004 | Landa et al. |
| 6,812,276 | B2 | 11/2004 | Yeager |
| 6,815,491 | B2 | 11/2004 | Adedeji et al. |
| 6,872,777 | B2 | 3/2005 | Adedeji et al. |
| 7,056,980 | B2 | 6/2006 | Adedeji et al. |
| 7,101,923 | B2 | 9/2006 | Campbell et al. |
| 7,119,136 | B2 | 10/2006 | Campbell et al. |
| 7,314,909 | B2 | 1/2008 | Riding et al. |
| 7,318,432 | B2 | 1/2008 | Rekstad |
| 2003/0162912 | A1 | 8/2003 | Disch et al. |
| 2005/0080185 | A1 | 4/2005 | Mhetar |
| 2006/0089458 | A1* | 4/2006 | Davis et al. ............. 525/92 D |
| 2007/0117912 | A1 | 5/2007 | Balfour et al. |
| 2008/0248278 | A1* | 10/2008 | Fisher et al. ............ 428/304.4 |

FOREIGN PATENT DOCUMENTS

| | | |
|---|---|---|
| EP | 0462410 A2 | 5/1991 |
| EP | 0578291 A2 | 6/1993 |
| EP | 0557654 A | 9/1993 |
| EP | 0592144 A1 | 9/1993 |
| WO | 01/53413 A1 | 7/2001 |

OTHER PUBLICATIONS

Database WPI, Derwent-Acc-No. 2003-221408, abstract of WO 03000785 A1 (Jan. 3, 2003).*
W.M.K. van Niekerk and T.B. Scheffler, "Measured Performance of a Solar Water Heater With a Parallel Tube Polymer Absorber", Solar Energy, vol. 51, No. 5, pp. 339-347 (1993).
P.T. Tsilingiris, "Towards making solar water heating technology feasible—the polymer solar collector approach", Energy Conversion & management, vol. 40, pp. 1237-1250 (1999).
M. Meir and J. Rekstad, "Der Solarnor Kunststoffkollektor—The development of a polymer collector with glazing", Proceedings of Polymeric Solar Materials, Erstes Leobener Symposium, Solartechnik—Neue Moglichkeiten fur die Kunststoffbranche, Polymer Competence Center Leoben, Oct. 7-8, 2003, Leoben, pp. II-1 to II-8.
M. Meir and J. Rekstad, "WP1.E7/Theoretical Evaluation of Promising System: Combisystem with Non-Pressurized Store and Polymer Collector", 2006, available at http://www.swt-technologie.de/NEGSTWP1.E7norwegiancombi 2006 0329.pdf (last visited Jan. 7, 2009).
Jay D. Burch, "Polymer-Based Solar Thermal Systems: Past, Present and Potential Products", "Polymer-based Solar Thermal Systems: Past, Present, and Potential Products,"Annual Technical Conference of the Society of Plastic Engineers (ANTEC2006), Charlotte, North Carolina, May 8-10, 2006, pp. 1877-1881.
SO 527, First Edition, Jun. 15, 1993 (54 pages).
ISO 178, Fourth Edition, Dec. 15, 2001 (23 pages).
ISO 180; Third Edition, Dec. 15, 2000 (16 pages).
ISO 306, Fourth Edition, Jul. 15, 2004 (16 pages).
ISO 1133, Third Edition, Jan. 15, 1997 (14 pages).
ISO 11443, Second Edition, Mar. 1, 2005 (40 pages).
ASTM D648, 2006 (13 pages).
International Application No. PCT/US2009/068419; International Filing Date Dec. 17, 2009; 5 pages.
Written Opinion of the International Searching Authority; International Application No. PCT/US2009/068419; International Filing Date Dec. 17, 2009; 4 pages.
Anonymous, "Solarnor heats up the global solar fthermal market with Noryl* EN150SP Resins"; Oct. 2005; available at www.solarnor.com (last visited Jan. 7, 2009).
International Search Report; International Application No. PCT/US2004/032998; International Filing Date Oct. 7, 2004; Date of Mailing Jan. 17, 2005; 10 pages.
Written Opinion; International Application No. PCT/US2004/032998; International Filing Date Oct. 7, 2004; Date of Mailing Jan. 17, 2005; 7 pages.
PCT/US2009/068419, International Preliminary Report on Patentability and Written Opinion, date of mailing Jul. 28, 2011; 6 pages.

* cited by examiner

*Primary Examiner* — Jeffrey Mullis
(74) *Attorney, Agent, or Firm* — Cantor Colburn LLP

(57) ABSTRACT

A profile extruded article includes a composition that is formed by melt-kneading particular amounts of a poly (arylene ether), a polystyrene-poly(ethylene-butylene)-polystyrene triblock copolymer, a homopolystyrene, and a polysalicylate. The article is particularly useful in the fabrication of solar collectors for low cost solar energy systems.

6 Claims, 1 Drawing Sheet

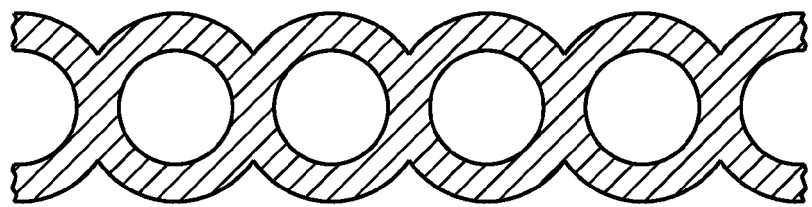
(a)
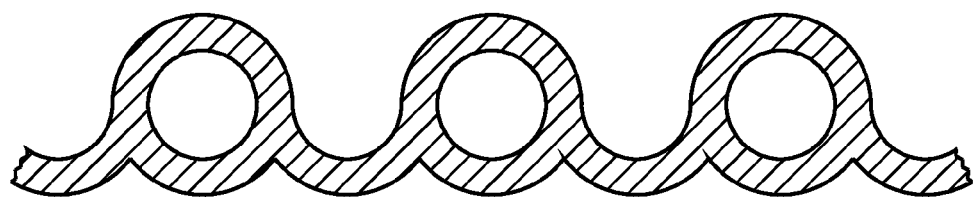
(b)
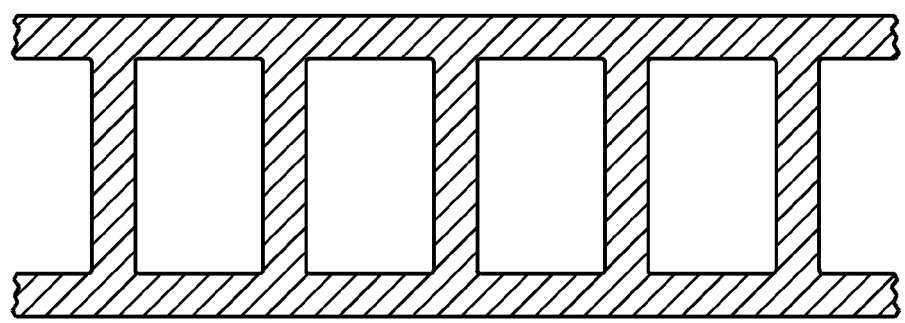
(c)

POLY(ARYLENE ETHER) ARTICLES AND COMPOSITIONS

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

One use of poly(arylene ether) has been in the fabrication of solar collectors that absorb sunlight and convert it to thermal energy than can be used to heat buildings and to generate hot water at reduced cost. In general, polymer-based solar collectors are much less expensive than conventional copper flat plate collectors, and they are therefore cost effective even in regions where energy is relatively inexpensive (e.g., in Norway, where hydroelectric power is plentiful). Among various polymers used in solar collectors, poly(arylene ether)/polystyrene blends offer an advantageous combination of heat resistance, hydrolytic stability, and ductility. Solar collectors utilizing poly(arylene ether)/polystyrene blends are described in M. Meir and J. Rekstad, "Der Solarnor Kunststoffkolektor—The development of a polymer collector with glazing", Proceedings of Polymeric Solar Materials, Erstes Leobener Symposium, Solartechnik—Neue Moglichkeiten fur die Kunststoffbranche, Polymer Competence Center Leoben, October 7-8, Leoben, pp. II-1 to II-8 (2003); and U.S. Patent Application Publication No. US2004/0261787 A1 of Rekstad. Although the poly(arylene ether/polystyrene blends used in these solar collectors have performed well, there is a desire for improved compositions that provide increases in impact strength as-molded and after thermal aging, without sacrificing other critical properties.

BRIEF DESCRIPTION OF THE INVENTION

The above-described and other drawbacks are alleviated by a profile extruded article comprising a composition comprising the product of melt-kneading: 45 to 70 weight percent of a poly(arylene ether) having a post-compounding weight average molecular weight of 50,000 to 60,000 atomic mass units; 9 to 20 weight percent of a polystyrene-poly(ethylene-butylene)-polystyrene triblock copolymer having a polystyrene content of 20 to 50 percent and a weight average molecular weight of at least 250,000 atomic mass units; 5 to 45 weight percent of homopolystyrene; and 1 to 9 weight percent of polysalicylate; wherein all weight percents are based on the total weight of the composition; and wherein the weight ratio of poly(arylene ether) to polystyrene-poly(ethylene-butylene)-polystyrene triblock copolymer is less than or equal to 6.5.

Another embodiment is a composition comprising the product of melt-kneading: 45 to 70 weight percent of a poly (arylene ether) having a post-compounding weight average molecular weight of 50,000 to 60,000 atomic mass units; 9 to 20 weight percent of a polystyrene-poly(ethylene-butylene)-polystyrene triblock copolymer having a weight average molecular weight of at least 250,000 atomic mass units; 5 to 45 weight percent of homopolystyrene; and 1 to 9 weight percent of polysalicylate; wherein all weight percents are based on the total weight of the composition; and wherein the weight ratio of poly(arylene ether) to polystyrene-poly(ethylene-butylene)-polystyrene triblock copolymer is less than or equal to 6.5.

These and other embodiments are described in detail below.

BRIEF DESCRIPTION OF THE FIGURE

The FIGURE shows cross-sectional views of portions of three multiwall extruded profiles.

DETAILED DESCRIPTION OF THE INVENTION

One embodiment is a profile extruded article comprising a composition comprising the product of melt-kneading: 45 to 70 weight percent of a poly(arylene ether) having a post-compounding weight average molecular weight of 50,000 to 60,000 atomic mass units; 9 to 20 weight percent of a polystyrene-poly(ethylene-butylene)-polystyrene triblock copolymer having a polystyrene content of 20 to 50 percent and a weight average molecular weight of at least 250,000 atomic mass units; 5 to 45 weight percent of homopolystyrene; and 1 to 9 weight percent of polysalicylate; wherein all weight percents are based on the total weight of the composition; and wherein the weight ratio of poly(arylene ether) to polystyrene-poly(ethylene-butylene)-polystyrene triblock copolymer is less than or equal to 6.5.

The profile extruded article can be formed by profile extrusion processes known in the art for poly(arylene ether) compositions. See, for example, U.S. Pat. No. 5,468,530 to Gotz et al., U.S. Pat. No. 5,629,062 to Ejiri et al., and U.S. Pat. No. 6,357,802 to Nozato et al. In some embodiments, the profile extrusion process comprises the step of extruding through a die the composition having a temperature of 220 to 240° C. Within this range, the composition temperature can be 225 to 235° C., specifically 230 to 235° C. The profile extrusion process can further include the step of cooling the extruded composition to form the extruded article. Cooling methods include cooling in a flow of circulating gas, such as air, or cooling in a water bath. A variety of profile extruded articles can be formed, including sheets, pipes, door frames, window frames, furniture trim, furniture frames, automotive trim, and the like. The compositions described herein are particularly useful for forming multiwall articles, that is, extruded articles having a structure that defines one or more hollow channels running continuously along the extrusion direction. One use of such multiwall articles is in the fabrication of solar collectors. Solar collectors employing such polymer-based components are described in, for example, J. D. Burch, "Polymer-Based Solar Thermal Systems: Past, Present and Potential Products", "Polymer-based Solar Thermal Systems: Past, Present, and Potential Products," Annual Technical Conference of the Society of Plastic Engineers (ANTEC2006), Charlotte, N.C., May 8-10, 2006, pp 1877-1881; W. M. K. van Niekerk and T. B. Scheffler, *Solar Energy*, volume 51, pages 339-347 (1993); P. I. Tsilingiris, "Towards making solar water heating technology feasible: the polymer solar collector approach", *Energy Conversion & Management*, volume 40, pages 1237-1250 (1999); M. Meir, J. Rekstad, "Der Solarnor Kunststoffkolektor—The development of a polymer collector with glazing", Proceedings of Polymeric Solar Materials, Erstes Leobener Symposium, Solartechnik—Neue Moglichkeiten fur die Kunststoffbranche, Polymer Competence Center Leoben, October 7-8, Leoben, pp. II-1 to II-8 (2003); available at http://www.physics.uio.no/energy/rebus/papers_rebus/meir_rekstad_10-2003.pdf (last visited Dec. 21, 2008); and U.S. Patent Application Publication No.

US2004/0261787 A1 of Rekstad. The present composition can be used to fabricate solar collectors as described in these references. Representative cross sections of portions of three multiwall extruded articles are depicted in parts (a) to (c) of the FIGURE.

The profile extruded article is formed by profile extruding a composition comprising particular amounts of a poly(arylene ether), a polystyrene-poly(ethylene-butylene)-polystyrene triblock copolymer, homopolystyrene, and a polysalicylate.

Suitable poly(arylene ether)s include those comprising repeating structural units having the formula

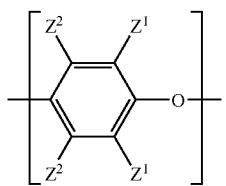

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) has a post-compounding weight average molecular weight of 50,000 to 60,000 atomic mass units, specifically 53,000 to 57,000 atomic mass units. It is well known that the molecular weight of a poly(arylene ether) can increase on compounding (e.g., melt kneading). The poly(arylene ether) used to form the composition therefore has a somewhat lower weight average molecular weight, which is typically 40,000 to 50,000 atomic mass units, specifically 43,000 to 47,000 atomic mass units.

The amount of poly(arylene ether) used to form the composition is 45 to 70 weight percent, specifically 50 to 60 weight percent, more specifically 55 to 60 weight percent, based on the total weight of the composition.

Another component used to form the composition is a polystyrene-poly(ethylene-butylene)-polystyrene triblock copolymer. Polystyrene-poly(ethylene-butylene)-polystyrene triblock copolymers and methods for their preparation are known in the art. They are typically prepared by hydrogenation of the aliphatic content of a polystyrene-polybutadiene-polystyrene triblock copolymer. For use in the present composition, the polystyrene-poly(ethylene-butylene)-polystyrene triblock copolymer preferably has a polystyrene content of 20 to 50 weight percent, specifically 25 to 40 weight percent, based on the weight of the triblock copolymer. It is also preferred to use a polystyrene-poly(ethylene-butylene)-polystyrene triblock copolymer with a weight average molecular weight of at least 250,000 atomic mass units, specifically 250,000 to 450,000 atomic mass units. An exemplary polystyrene-poly(ethylene-butylene)-polystyrene triblock copolymer is commercially available as KRATON G1651 from Kraton Polymers.

The amount of the polystyrene-poly(ethylene-butylene)-polystyrene triblock copolymer used to form the composition is 9 to 20 weight percent, specifically 10 to 18 weight percent, more specifically 11 to 16 weight percent, based on the total weight of the composition. It is also important to maintain a minimum amount of triblock copolymer relative to poly(arylene ether). Thus, the weight ratio of poly(arylene ether) to polystyrene-poly(ethylene-butylene)-polystyrene triblock copolymer is less than or equal to 6.5, specifically 2.25 to 6.5, more specifically 3 to 5.

Another component used to form the composition is a homopolystyrene. As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene is atactic. In some embodiments, the homopolystyrene has a melt volume flow rate of 1.5 to 5 cubic centimeters per 10 minutes, measured at 200° C. and 5 kilogram load according to ISO 1133.

The amount of homopolystyrene used to form the composition is 5 to 45 weight percent, specifically 10 to 20 weight percent, more specifically 15 to 25 weight percent, based on the total weight of the composition.

Another component used to form the composition is polysalicylate. Polysalicylate is a condensation polymer of salicylic acid. Polysalicylate and methods for its preparation are known in the art. It is preferred that the polysalicylate have a number average molecular weight of at least 1,000 atomic mass units, specifically at least 1,500 atomic mass units. While not wishing to be bound by any particular theory of reaction during compounding, applicants believe that the polysalicylate reacts with the terminal hydroxyl groups of the poly(arylene ether) to form a polysalicylate-capped poly (arylene ether). Similar reactions are described in U.S. Pat. No. 4,760,118 of White et al.

The amount of polysalicylate used to form the composition is 1 to 9 weight percent, specifically 2 to 7 weight percent, more specifically 3 to 6 weight percent, based on the total weight of the composition.

In addition to the components described above, the composition can, optionally, further comprise various additives known in the thermoplastics art. For example, the composition can, optionally, further comprise an additive chosen from stabilizers, antioxidants, mold release agents, processing aids, flame retardants, drip retardants, nucleating agents, UV blockers, dyes, pigments, fragrances, anti-static agents, metal deactivators, antiblocking agents, and the like, and combinations thereof When present, additives are typically used in a total amount of about 0.5 to 10 weight percent, based on the total weight of the composition.

In some embodiments, the composition excludes fillers, including reinforcing fillers and nonreinforcing fillers. For example, when the composition is use to form multiwall sheets from which solar collectors are fabricated, fillers can detract from the impact strength of the multiwall sheets.

In some embodiments, the composition comprises less than 2 weight percent any polymer other than the poly (arylene ether), the polystyrene-poly(ethylene-butylene)-polystyrene triblock copolymer, the homopolystyrene, and the polysalicylate. The amounts of such components can be less than 1 weight percent, or less than 0.1 weight percent, or such components can be completely excluded from the composition. Examples of polymers that can be excluded are rubber-modified polystyrenes, polyamides, polyolefins, polyesters, and thermoset resins.

In a very specific embodiment of the profile extruded article, the composition comprises the product of melt-kneading: 55 to 65 weight percent of a poly(arylene ether) having a post-compounding weight average molecular weight of 53,000 to 57,000 atomic mass units; 11 to 16 weight percent of a polystyrene-poly(ethylene-butylene)-polystyrene triblock copolymer having a polystyrene content of 25 to 40 percent and a weight average molecular weight of 250,000 to 450,000 atomic mass units; 15 to 25 weight percent of homopolystyrene; 3 to 6 weight percent of polysalicylate; and wherein the weight ratio of poly(arylene ether) to polystyrene-poly(ethylene-butylene)-polystyrene triblock copolymer is 3 to 5.

The composition is formed by melt kneading the poly (arylene ether), the polystyrene-poly(ethylene-butylene)-polystyrene, the homopolystyrene, and the polysalicylate. Melt-kneading equipment is known in the art and includes single-screw and twin-screw type extruders and similar mixing devices that apply shear to the components. Specific melt-kneading procedures are described in the working examples below.

The melt-kneaded composition exhibits a previously unattainable combination of processability, ductility, and heat resistance, as well as ductility after thermal aging. Thus, in some embodiments, the composition exhibits a tensile stress at yield of at least 60 megapascals (specifically 60 to 75 megapascals, more specifically 60 to 65 megapascals) measured at 23° C. according to ISO 527, a tensile modulus of at least 2200 megapascals (specifically 2200 to 2700 megapascals, more specifically 2300 to 2450 megapascals) measured at 23° C. according to ISO 527, a flexural strength of at least 80 megapascals (specifically 80 to 110 megapascals, more specifically 85 to 105 megapascals, still more specifically 90 to 110 megapascals) measured at 23° C. according to ISO 178, a melt volume-flow rate of at least 20 cubic centimeters per minute (specifically 20 to 55 cubic centimeters per minute, more specifically 25 to 40 cubic centimeters per minute) measured at 300° C. and 10 kilogram load according to ISO 1133, a heat deflection temperature of at least 140° C. (specifically 140 to 160° C., more specifically 150 to 160° C.) measured at 0.45 megapascals according to ISO 75/Bf, an Izod notched impact strength of at least 18 kilojoules/meter$^2$ (specifically 18 to 35 kilojoules/meter$^2$, more specifically 20 to 30 kilojoules/meter$^2$) measured at 23° C. according to ISO 180/1A, and an Izod notched impact strength of at least 7 kilojoules/meter$^2$ (specifically 7 to 20 kilojoules/meter$^2$, more specifically 7 to 10 kilojoules/meter$^2$) measured at 23° C. according to ISO 180/1A after aging for 2000 hours in air at 140° C.

The invention extends to the composition used to form the profile-extruded articles. Thus, one embodiment is a composition comprising the product of melt-kneading: 45 to 70 weight percent of a poly(arylene ether) having a post-compounding weight average molecular weight of 50,000 to 60,000 atomic mass units; 9 to 20 weight percent of a polystyrene-poly(ethylene-butylene)-polystyrene triblock copolymer having a weight average molecular weight of at least 250,000 atomic mass units; 5 to 45 weight percent of homopolystyrene; and 1 to 9 weight percent of polysalicylate; wherein all weight percents are based on the total weight of the composition; and wherein the weight ratio of poly(arylene ether) to polystyrene-poly(ethylene-butylene)-polystyrene triblock copolymer is less than or equal to 6.5.

The various embodiments described above in the context of the profile-extruded articles apply also to the composition. For example, in a very specific embodiment, the composition comprises the product of melt-kneading: 55 to 65 weight percent of a poly(arylene ether) having a post-compounding weight average molecular weight of 53,000 to 57,000 atomic mass units; 11 to 16 weight percent of a polystyrene-poly (ethylene-butylene)-polystyrene triblock copolymer having a polystyrene content of 25 to 40 percent and a weight average molecular weight of 250,000 to 450,000 atomic mass units; 15 to 25 weight percent of homopolystyrene; and 3 to 6 weight percent of polysalicylate; wherein the weight ratio of poly(arylene ether) to polystyrene-poly(ethylene-butylene)-polystyrene triblock copolymer is 3 to 5.

The invention includes at least the following embodiments.

Embodiment 1: A profile extruded article comprising a composition comprising the product of melt-kneading: 45 to 70 weight percent of a poly(arylene ether) having a post-compounding weight average molecular weight of 50,000 to 60,000 atomic mass units; 9 to 20 weight percent of a polystyrene-poly(ethylene-butylene)-polystyrene triblock copolymer having a polystyrene content of 20 to 50 percent and a weight average molecular weight of at least 250,000 atomic mass units; 5 to 45 weight percent of homopolystyrene; and 1 to 9 weight percent of polysalicylate; wherein all weight percents are based on the total weight of the composition; and wherein the weight ratio of poly(arylene ether) to polystyrene-poly(ethylene-butylene)-polystyrene triblock copolymer is less than or equal to 6.5.

Embodiment 2: The profile extruded article of embodiment 1, wherein the poly(arylene ether) has a pre-compounding weight average molecular weight of 40,000 to 50,000 atomic mass units.

Embodiment 3: The profile extruded article of embodiment 1 or 2, wherein the composition exhibits a tensile stress at yield of at least 60 megapascals, measured at 23° C. according to ISO 527, a tensile modulus of at least 2200 megapascals, measured at 23° C. according to ISO 527, a flexural strength of at least 80 megapascals, measured at 23° C. according to ISO 178, a melt volume-flow rate of at least 20 cubic centimeters per minute, measured at 300° C. and 10 kilogram load according to ISO 1133, a heat deflection temperature of at least 140° C., measured at 0.45 megapascals according to ISO 75/Bf, an Izod notched impact strength of at least 18 kilojoules/meter$^2$, measured at 23° C. according to ISO 180/1A, and an Izod notched impact strength of at least 7 kilojoules/meter$^2$, measured at 23° C. according to ISO 180/1A after aging for 2000 hours in air at 140° C.

Embodiment 4: The profile extruded article of any of embodiments 1-3, wherein the composition comprises less than 2 weight percent any polymer other than the poly (arylene ether), the polystyrene-poly(ethylene-butylene)-polystyrene triblock copolymer, the homopolystyrene, and the polysalicylate.

Embodiment 5: The profile extruded article of claim 1, wherein the composition excludes fillers.

Embodiment 6: The profile extruded article of embodiment 1, wherein the composition comprises the product of melt-kneading: 55 to 65 weight percent of a poly(arylene ether) having a post-compounding weight average molecular weight of 53,000 to 57,000 atomic mass units; 11 to 16 weight percent of a polystyrene-poly(ethylene-butylene)-polystyrene triblock copolymer having a polystyrene content of 25 to 40 percent and a weight average molecular weight of 250,000 to 450,000 atomic mass units; 15 to 25 weight percent of homopolystyrene; and 3 to 6 weight percent of polysalicylate; wherein the weight ratio of poly(arylene ether) to polystyrene-poly(ethylene-butylene)-polystyrene triblock copolymer is 3 to 5.

Embodiment 7: The profile extruded article of embodiment 1, wherein the profile extruded article is a multiwall article.

Embodiment 8: A composition comprising the product of melt-kneading: 45 to 70 weight percent of a poly(arylene ether) having a post-compounding weight average molecular weight of 50,000 to 60,000 atomic mass units; 9 to 20 weight percent of a polystyrene-poly(ethylene-butylene)-polystyrene triblock copolymer having a weight average molecular weight of at least 250,000 atomic mass units; 5 to 45 weight percent of homopolystyrene; and 1 to 9 weight percent of polysalicylate; wherein all weight percents are based on the total weight of the composition; and wherein the weight ratio of poly(arylene ether) to polystyrene-poly(ethylene-butylene)-polystyrene triblock copolymer is less than or equal to 6.5.

Embodiment 9: The composition of embodiment 8, wherein the composition comprises the product of melt-kneading: 55 to 65 weight percent of a poly(arylene ether) having a post-compounding weight average molecular weight of 53,000 to 57,000 atomic mass units; 11 to 16 weight percent of a polystyrene-poly(ethylene-butylene)-polystyrene triblock copolymer having a polystyrene content of 25 to 40 percent and a weight average molecular weight of 250,000 to 450,000 atomic mass units; 15 to 25 weight percent of homopolystyrene; and 3 to 6 weight percent of polysalicylate; wherein the weight ratio of poly(arylene ether) to polystyrene-poly(ethylene-butylene)-polystyrene triblock copolymer is 3 to 5.

The invention is further illustrated by the following non-limiting examples.

Comparative Examples 1-6

These comparative examples illustrate the property deficiencies of compositions lacking polysalicylate.

Components used to form the compositions are summarized in Table 1.

TABLE 1

| Component | Description |
| --- | --- |
| PPE 0.40 | Poly(2,6-dimethyl-1,4-phenylene ether) (CAS Reg. No. 25134-01-4) having an intrinsic viscosity of about 0.40 deciliter per gram and a weight average molecular weight of about 55,000 atomic mass units; obtained as PPO 640 or PPO 803 from SABIC Innovative Plastics. |
| PPE 0.46 | Poly(2,6-dimethyl-1,4-phenylene ether) (CAS Reg. No. 25134-01-4) having an intrinsic viscosity of about 0.46 deciliter per gram and a weight average molecular weight of about 59,000 atomic mass units; obtained as PPO 646 or PPO 800 from SABIC Innovative Plastics. |
| PS | Atactic homopolystyrene (CAS Reg. No. 9003-53-6) having a melt volume flow rate of 2.8 cubic centimeters per 10 minutes measured at 200° C. and 5 kilogram load according to ISO 1133; obtained as 251N from Ineos Nova. |
| SEBS | Polystyrene-poly(ethylene-butylene)-polystyrene (CAS Reg. No.66070-58-4) having a polystyrene content of about 33 weight percent, obtained as KRATON G1651 from Kraton Polymers. |
| PSAL | Polysalicylate (CAS Reg. No. 125542-70-3) having a weight average molecular weight of at least 2,000 atomic mass units; obtained as Polysalicylate from Proviron Fine Chemicals. |
| LLDPE | Linear Low Density Polyethylene (CAS Reg. No. 25087-34-7); obtained as MG2000024 from SABIC Europe. |
| ZnS | Zinc Sulfide (CAS Reg. No. 1314-98-3); obtained as Sachtotlith HD from Sachtleben. |
| ZnO | Zinc Oxide (CAS Reg. No. 1314-13-2); obtained from Norkem. |
| Stabilizer | Tris(di-t-butylphenyl)phosphite (CAS Reg. No. 31570-04-4); obtained as IRGAFOS 168 from Ciba Specialty Chemicals. |
| Antioxidant | Antioxidant; obtained as IRGANOX 1010 (CAS Reg. No. 6683-19-8); obtained from Ciba Specialty Chemicals. |
| Metal Deactivator | Metal Deactivator; obtained as IRGANOX MD1024 (CAS Reg. No. 32687-78-8) from Ciba Specialty Chemicals. |
| Carbon Black | Carbon Black (CAS Reg. No. 1333-86-4), obtained as ELFTEX 570 from Cabot. |

Compositions were prepared by melt-kneading the components in a twin-screw extruder. The individual components were metered into the extruder using suitable feeders. Typically, polystyrene (PS) was fed by itself as a pellet while the other ingredients were dry blended in a mixer and then added to the extruder via a separate feeder. The extruder was operated at feed rates of about 15 to 20 kilograms/hour and at a screw rotation rate of about 300 rotations per minute. The extruder barrel temperatures were set between 260 to 300° C., other than the feed zones, which were set to a lower temperature. The extruder included atmospheric and vacuum vents.

Test articles were molded using a 110 ton Engel injection molding machine operated at barrel temperatures of about 260 to 295° C. and mold temperatures of about 100° C. Materials were dried for up to two hours at temperatures of about 80 to 100° C.

Compositions and properties are summarized in Table 2. All tensile properties were measured at 23° C. according to ISO 527, using a speed of 50 millimeters per minute. The tensile properties are tensile modulus (expressed in megapascals), tensile stress at yield (expressed in megapascals), tensile stress at break (expressed in megapascals), tensile elongation at yield (expressed in percent), and tensile elongation at break (expressed in percent). Flexural properties were measured at 23° C. according to ISO 178, using a speed of 2 millimeters per minute. The flexural properties are flexural modulus (expressed in megapascals) and flexural stress (expressed in megapascals). Izod notched impact strength was measured at 23° C. or −30° C. according to ISO 180/1A. Vicat softening temperature (expressed in degrees centigrade) was measured according to ISO 306, Method B/120, which utilizes a load of 50 newtons and a heating rate of 120° C. per hour. Heat deflection temperature was measured according to ISO 75 using Method B, which calls for an outer fiber stress of 0.45 megapascals, and a flatwise specimen orientation. Melt volume-flow rate (expressed in cubic centimeters per 10 minutes) was measured according to ISO 1133, using a temperature of 300° C. and a 10 kilogram load. Melt viscosity (expressed in pascal-seconds) was measured according to ISO 11443, using a temperature of 280° C. and a shear rate of 1,500 second$^{-1}$.

Izod notched impact strength was evaluated on as-molded samples and samples that had been subjected to 2000 hours of aging at 140° C. in air. The samples were notched before aging.

The property results in Table 2 show that blends containing poly(arylene ether), homopolystyrene, and polystyrene-poly(ethylene-butylene)-polystyrene but lacking polysalicylate exhibit deficiencies in as-molded tensile modulus (five out of six samples), as-molded tensile stress at yield (six out of six samples), and post-aging Izod notched impact strength (four out of four samples tested). Thus, these comparative examples do not simultaneously satisfy all the property requirements of the present invention. As a practical matter, these property deficiencies mean that hollow extruded articles molded from the compositions are more likely to fail under the mechanical stresses encountered during assembly or use. For example, when the extruded article is a solar collector component of a solar water heater, it undergoes thermal aging under normal operating conditions in which heat transfer fluid is flowing through it, and it undergoes even more severe thermal aging under "stagnation conditions" in which case the solar collector is heated by the sun without the heat transfer fluid flowing through it (and thus cooling it).

TABLE 2

| | C. Ex. 1 | C. Ex. 2 | C. Ex. 3 | C. Ex. 4 | C. Ex. 5 | C. Ex. 6 |
|---|---|---|---|---|---|---|
| COMPOSITIONS | | | | | | |
| PPE 0.40 | 51.8 | 51.8 | 0 | 0 | 51.8 | 51.8 |
| PPE 0.46 | 0 | 0 | 51.8 | 51.8 | 0 | 0 |
| SEBS | 16.0 | 16.0 | 16.0 | 16.0 | 16.0 | 16.0 |
| PS | 31.7 | 31.7 | 31.7 | 31.7 | 29.9 | 29.9 |
| PSAL | 0 | 0 | 0 | 0 | 0 | 0 |
| ZnS | 0.10 | 0.10 | 0.10 | 0.10 | 0.15 | 0.15 |
| ZnO | 0.10 | 0.10 | 0.10 | 0.10 | 0.15 | 0.15 |
| Stabilizer | 0.30 | 0.30 | 0.30 | 0.30 | 1.00 | 1.00 |
| Antioxidant | 0 | 0 | 0 | 0 | 1.00 | 1.00 |
| Metal deactivator | 0 | 0 | 0 | 0 | 0 | 0 |
| Carbon black | 1.5 | 1.5 | 1.5 | 1.5 | 1.5 | 1.5 |
| total all components | 101.5 | 101.5 | 101.5 | 101.5 | 101.5 | 101.5 |
| PPE/SEBS weight ratio | 3.2 | 3.2 | 3.2 | 3.2 | 3.2 | 3.2 |
| PROPERTIES as molded | | | | | | |
| Tensile Modulus (MPa) | 2151 | 2175 | 2200 | 1907 | 2152 | 2129 |
| Tensile Stress at yield (MPa) | 54.6 | 55.8 | 57.7 | 42.7 | 54.4 | 53.7 |
| Tensile Stress at break (MPa) | 46.2 | 46.2 | 48.0 | 41.7 | 46.1 | 45.9 |
| Tensile elongation at yield (%) | 4.1 | 4.0 | 4.0 | 4.3 | 3.9 | 4.0 |
| Tensile elongation at break (%) | 17.2 | 14.4 | 11.4 | 15.7 | 14.3 | 17.7 |
| Flexural Modulus (MPa) | 2193 | 2199 | 2263 | 2222 | 2122 | 2098 |
| Flexural Stress (MPa) | 84.7 | 87.6 | 90.7 | 88.7 | 84.1 | 83.9 |
| Izod Notched Impact, 23° C. (kJ/m$^2$) | 32.8 | 34.0 | 33.8 | 34.5 | 35.4 | 34.4 |
| Izod Notched Impact, −30° C. (kJ/m$^2$) | | | | | | |
| Vicat B/120 (° C.) | 153.5 | 152.7 | 153.5 | 153.5 | 150.5 | 151.1 |
| HDT/B (° C.) | 146.7 | 146.4 | 146.2 | 147.3 | 144.6 | 144.1 |
| MVR (cc/10 min) | — | — | — | — | — | — |
| MV (Pa-sec) | 319 | 335 | 353 | 344 | 324 | 317 |
| after heat aging at 130° C. for 2000 h | | | | | | |
| Tensile Stress at Yield (MPa) | 39.9 | 45.7 | 49.4 | 45.2 | 46.2 | 40.8 |
| Tensile Strain at Break (%) | 2.0 | 2.3 | 2.5 | 2.3 | 2.3 | 2.0 |
| Izod Notched Impact, 23° C. (kJ/m$^2$) | 17.2 | 14.4 | 11.4 | 15.7 | 14.3 | 17.7 |
| after heat aging at 140° C. for 2000 h | | | | | | |
| Tensile Stress at Yield (MPa) | 44.3 | 44.1 | 46.5 | 47.6 | 45.8 | 45.8 |
| Tensile Strain at Break (%) | 2.20 | 2.18 | 2.3 | 2.42 | 2.3 | 2.34 |
| Izod Notched Impact, 23° C. (kJ/m$^2$) | 6.3 | 6.8 | 7.1 | 6.6 | — | — |

Examples 1-3, Comparative Examples 7-9

These examples demonstrate that compositions of the invention simultaneously satisfy the property requirements of as-molded tensile modulus, as-molded tensile stress at yield, as-molded flexural stress, as-molded Izod notched impact strength, as-molded heat distortion temperature, and post-aging Izod notched impact strength. The examples also demonstrate that at least one of these properties is deficient when the composition contains inadequate polysalicylate or inadequate polystyrene-poly(ethylene-butylene)-polystyrene.

Compositions were prepared as described for Comparative Examples 1-6, except that Examples 1-3 and Comparative Example 9 included polysalicylate, which was incorporated as part of the dry blend that was fed to the twin-screw extruder.

The results in Table 3 show that Comparative Example 7, which lacked polysalicylate, was deficient in post-aging Izod notched impact strength. Comparative Example 8, which also lacked polysalicylate, was deficient in as-molded tensile modulus, as-molded tensile stress at yield, and post-aging Izod notched impact strength. Comparative Example 9, which included polysalicylate but included less than 9 weight percent of polystyrene-poly(ethylene-butylene)-polystyrene, was deficient in Izod notched impact strength in both as-molded and post-aging samples. Inventive examples 1-3 satisfied all property requirements. The effect of substituting polysalicylate for a portion of the homopolystyrene is illustrate by comparison of Comparative Example 7 (without polysalicylate) with Example 1 (with polysalicylate, exhibiting superior post-aging Izod notched impact strength), and comparison of Comparative Example 8 (without polysalicylate) with Example 2 (with polysalicylate, exhibiting superior as-molded tensile modulus and tensile stress at yield).

TABLE 3

| | C Ex. 7 | C. Ex. 8 | Ex. 1 | Ex. 2 | Ex. 3 | C. Ex. 9 |
|---|---|---|---|---|---|---|
| COMPOSITIONS | | | | | | |
| PPE 0.40 | 62.0 | 51.8 | 62.0 | 51.8 | 62.0 | 62.0 |
| SEBS | 12.0 | 16.0 | 12.0 | 16.0 | 16.0 | 8.0 |
| PS | 24.9 | 31.1 | 20.5 | 27.3 | 16.5 | 24.5 |
| PSAL | 0 | 0 | 4.4 | 3.8 | 4.4 | 4.4 |
| ZnS | 0.15 | 0.15 | 0.15 | 0.15 | 0.15 | 0.15 |
| ZnO | 0.15 | 0.15 | 0.15 | 0.15 | 0.15 | 0.15 |
| Stabilizer | 0.30 | 0.30 | 0.30 | 0.30 | 0.30 | 0.30 |
| Antioxidant | 0.50 | 0.50 | 0.50 | 0.50 | 0.50 | 0.50 |
| Metal deactivator | 0 | 0 | 0 | 0 | 0 | 0 |
| Carbon black | 1.5 | 1.5 | 1.5 | 1.5 | 1.5 | 1.5 |
| total all components | 101.5 | 101.5 | 101.5 | 101.5 | 101.5 | 101.5 |
| PPE/SEBS weight ratio | 5.2 | 3.2 | 5.2 | 3.2 | 3.9 | 7.8 |
| PROPERTIES as molded | | | | | | |
| Tensile Modulus (MPa) | 2312 | 2130 | 2485 | 2325 | 2329 | 2692 |
| Tensile Stress at yield (MPa) | 62.1 | 53.8 | 70.7 | 61.6 | 66.0 | 75.9 |
| Tensile Stress at break (MPa) | 51.5 | 46.3 | 58.8 | 50.4 | 53.9 | 63.5 |
| Tensile elongation at yield (%) | 4.4 | 4.1 | 4.4 | 3.9 | 4.3 | 4.5 |
| Tensile elongation at break (%) | 13.3 | 15.9 | 6.1 | 8.0 | 6.9 | 6.4 |
| Flexural Modulus (MPa) | 2388 | 2226 | — | 2380 | 2386 | 2710 |
| Flexural Stress (MPa) | 93.2 | 83.3 | — | 92.4 | 96.6 | 113.4 |
| Izod Notched Impact, 23° C. (kJ/m$^2$) | 28.3 | 33.3 | 20.1 | 27.3 | 25.7 | 12.5 |
| Izod Notched Impact, −30° C. (kJ/m$^2$) | | | | | | |
| Vicat B/120 (° C.) | 164.6 | 152.5 | 156.8 | 145.9 | 158.0 | 156.0 |
| HDT/B (° C.) | 157.1 | 146.5 | 148.3 | 139.9 | 151.4 | 147.1 |
| MVR (cc/10 min) | 29.5 | 37.2 | 42.4 | 52.3 | 35.4 | 49.5 |
| MV (Pa-sec) | 448 | 329 | 403 | 306 | 475 | 345 |
| after heat aging at 130° C. for 2000 h | | | | | | |
| Tensile Stress at Yield (MPa) | 44.2 | 42.6 | 67.9 | 53.7 | 63.3 | 74.1 |
| Tensile Strain at Break (%) | 2.0 | 2.1 | 4.3 | 6.1 | 4.3 | 4.3 |
| Izod Notched Impact, 23° C. (kJ/m$^2$) | 6.4 | 6.0 | 11.8 | — | 14.4 | 5.5 |
| after heat aging at 140° C. for 2000 h | | | | | | |
| Tensile Stress at Yield (MPa) | 45.8 | 40.1 | 62.4 | 53.5 | 65.9 | 44.4 |
| Tensile Strain at Break (%) | 2.1 | 1.9 | 3.0 | 2.8 | 3.5 | 1.8 |
| Izod Notched Impact, 23° C. (kJ/m$^2$) | 6.8 | 5.7 | 7.8 | — | 9.8 | 4.2 |

Examples 4-9

These examples further illustrate the excellent as-molded properties of compositions according to the invention.

TABLE 4

| | Ex. 4 | Ex. 5 | Ex. 6 | Ex. 7 | Ex. 8 | Ex. 9 |
|---|---|---|---|---|---|---|
| COMPOSITIONS | | | | | | |
| PPE 0.40 | 57.5 | 62.5 | 62.5 | 67.5 | 67.5 | 57.5 |
| SEBS | 16 | 16 | 11 | 11 | 16 | 11 |
| PS | 21.3 | 16 | 21 | 15.7 | 10.7 | 26.3 |
| PSAL | 4 | 4.3 | 4.3 | 4.6 | 4.6 | 4 |
| ZnS | 0.15 | 0.15 | 0.15 | 0.15 | 0.15 | 0.15 |

TABLE 4-continued

|  | Ex. 4 | Ex. 5 | Ex. 6 | Ex. 7 | Ex. 8 | Ex. 9 |
|---|---|---|---|---|---|---|
| ZnO | 0.15 | 0.15 | 0.15 | 0.15 | 0.15 | 0.15 |
| Stabilizer | 0.30 | 0.30 | 0.30 | 0.30 | 0.30 | 0.30 |
| Antioxidant | 0.50 | 0.50 | 0.50 | 0.50 | 0.50 | 0.50 |
| Metal Deactivator | 0.10 | 0.10 | 0.10 | 0.10 | 0.10 | 0.10 |
| Carbon Black | 1.5 | 1.5 | 1.5 | 1.5 | 1.5 | 1.5 |
| total all components | 101.5 | 101.5 | 101.5 | 101.5 | 101.5 | 101.5 |
| PPE/SEBS weight ratio | 3.6 | 3.9 | 5.7 | 6.1 | 4.2 | 5.2 |
| PROPERTIES AS MOLDED | | | | | | |
| Tensile Modulus (MPa) | 2402 | 2376 | 2624 | 2537 | 2396 | 2656 |
| Tensile Stress at yield (MPa) | 64 | 66 | 73 | 72 | 68 | 70 |
| Tensile Stress at break (MPa) | 53 | 52 | 61 | 57 | 52 | 55 |
| Tensile elongation at yield (%) | 4.13 | 4.37 | 4.49 | 4.67 | 4.69 | 4.18 |
| Tensile elongation at break (%) | 6.12 | 6.94 | 6.14 | 6.56 | 7.54 | 6.78 |
| Flexural Modulus (MPa) | 2406 | 2271 | 2527 | 2385 | 2265 | 2416 |
| Flexural Stress (MPa) | 95.1 | 92.3 | 104.8 | 102.0 | 94.6 | 99.7 |
| Izod Notched Impact, 23° C. (kJ/m$^2$) | 31.4 | 30.8 | 18.6 | 19.9 | 28.0 | 20.4 |
| Izod Notched Impact, −30° C. (kJ/m$^2$) | 12.1 | 11.7 | 7.1 | 7.7 | 9.8 | 7.4 |
| Vicat B/120 (° C.) | 151.4 | 157.4 | 156.0 | 161.5 | 163.5 | 149.9 |
| HDT/B (° C.) | 143.9 | 150.5 | 147.3 | 153.6 | 157.2 | 141.5 |
| MVR (cc/10 min) | 39.6 | 34.7 | 43.6 | 35.5 | 32.0 | 47.1 |

Examples 10-14, Comparative Example 10

These examples further illustrate the excellent as-molded properties of compositions according to the invention. Comparative Example 10, which had a PPE/SEBS ratio exceeding 6.5, exhibited inferior Izod notched impact strength.

TABLE 5

|  | Ex. 10 | Ex. 11 | Ex. 12 | Ex. 13 | Ex. 14 | C. Ex. 10 |
|---|---|---|---|---|---|---|
| COMPOSITIONS | | | | | | |
| PPE 0.40 | 57.5 | 62.5 | 62.5 | 67.5 | 67.5 | 72.5 |
| SEBS | 16 | 16 | 11 | 11 | 16 | 11 |
| PS | 19.8 | 14.5 | 19.5 | 14.2 | 9.2 | 8.9 |
| PSAL | 4 | 4.3 | 4.3 | 4.6 | 4.6 | 4.9 |
| LLDPE | 1.5 | 1.5 | 1.5 | 1.5 | 1.5 | 1.5 |
| ZnS | 0.15 | 0.15 | 0.15 | 0.15 | 0.15 | 0.15 |
| ZnO | 0.15 | 0.15 | 0.15 | 0.15 | 0.15 | 0.15 |
| Stabilizer | 0.30 | 0.30 | 0.30 | 0.30 | 0.30 | 0.30 |
| Antioxidant | 0.50 | 0.50 | 0.50 | 0.50 | 0.50 | 0.50 |
| Metal Deactivator | 0.10 | 0.10 | 0.10 | 0.10 | 0.10 | 0.10 |
| Carbon Black | 1.5 | 1.5 | 1.5 | 1.5 | 1.5 | 1.5 |
| total all components | 101.5 | 101.5 | 101.5 | 101.5 | 101.5 | 101.5 |
| PPE/SEBS weight ratio | 3.6 | 3.9 | 5.7 | 6.1 | 4.2 | 6.6 |
| PROPERTIES AS MOLDED | | | | | | |
| Tensile Modulus (MPa) | 2351 | 2378 | 2382 | 2531 | 2328 | 2536 |
| Tensile Stress at yield (MPa) | 63 | 66 | 65 | 72 | 65 | 73 |
| Tensile Stress at break (MPa) | 51 | 51 | 51 | 54 | 52 | 59 |
| Tensile elongation at yield (%) | 4.28 | 4.58 | 4.35 | 4.74 | 4.70 | 4.89 |
| Tensile elongation at break (%) | 7.16 | 7.20 | 7.48 | 7.02 | 8.92 | 7.08 |
| Flexural Modulus (MPa) | 2309 | 2281 | 2265 | 2338 | 2203 | 2385 |
| Flexural Stress (MPa) | 91.5 | 94.6 | 93.1 | 101.9 | 93.1 | 103.0 |
| Izod Notched Impact, 23° C. (kJ/m$^2$) | 29.8 | 27.2 | 30.1 | 18.2 | 32.4 | 15.2 |
| Izod Notched Impact, −30° C. (kJ/m$^2$) | 12.0 | 9.5 | 11.5 | 7.1 | 12.0 | 7.0 |
| HDT/B (° C.) | 144.6 | 152.5 | 145.3 | 155.0 | 158.2 | 160.2 |
| MVR (cc/10 min) | 44.9 | 38.0 | 42.7 | 35.1 | 29.7 | 29.8 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A profile extruded article comprising a composition comprising the product of melt-kneading:
   45 to 70 weight percent of a poly(arylene ether) having a post-compounding weight average molecular weight of 50,000 to 60,000 atomic mass units;
   9 to 20 weight percent of a polystyrene-poly(ethylene-butylene)-polystyrene triblock copolymer having a polystyrene content of 20 to 50 percent and a weight average molecular weight of at least 250,000 atomic mass units;
   5 to 45 weight percent of homopolystyrene; and
   1 to 9 weight percent of polysalicylate;
   wherein all weight percents are based on the total weight of the composition;
   wherein the weight ratio of poly(arylene ether) to polystyrene-poly(ethylene-butylene)-polystyrene triblock copolymer is less than or equal to 6.5;
   wherein the profile extruded article is a multiwall article; and
   wherein the profile extruded article is a solar collector.

2. The profile extruded article of claim 1, wherein the poly(arylene ether) has a pre-compounding weight average molecular weight of 40,000 to 50,000 atomic mass units.

3. The profile extruded article of claim 1, wherein the composition exhibits
   a tensile stress at yield of at least 60 megapascals, measured at 23° C. according to ISO 527,
   a tensile modulus of at least 2200 megapascals, measured at 23° C. according to ISO 527,
   a flexural strength of at least 80 megapascals, measured at 23° C. according to ISO 178,
   a melt volume-flow rate of at least 20 cubic centimeters per minute, measured at 300° C. and 10 kilogram load according to ISO 1133,
   a heat deflection temperature of at least 140° C., measured at 0.45 megapascals according to ISO 75/Bf,
   an Izod notched impact strength of at least 18 kilojoules/meter$^2$, measured at 23° C. according to ISO 180/1A, and
   an Izod notched impact strength of at least 7 kilojoules/meter$^2$, measured at 23° C. according to ISO 180/1A after aging for 2000 hours in air at 140° C.

4. The profile extruded article of claim 1, wherein the composition comprises less than 2 weight percent any polymer other than the poly(arylene ether), the polystyrene-poly(ethylene-butylene)-polystyrene triblock copolymer, the homopolystyrene, and the polysalicylate.

5. The profile extruded article of claim 1, wherein the composition excludes fillers.

6. The profile extruded article of claim 1, wherein the composition comprises the product of melt-kneading:
   55 to 65 weight percent of a poly(arylene ether) having a post-compounding weight average molecular weight of 53,000 to 57,000 atomic mass units;
   11 to 16 weight percent of a polystyrene-poly(ethylene-butylene)-polystyrene triblock copolymer having a polystyrene content of 25 to 40 percent and a weight average molecular weight of 250,000 to 450,000 atomic mass units;
   15 to 25 weight percent of homopolystyrene; and
   3 to 6 weight percent of polysalicylate;
   wherein the weight ratio of poly(arylene ether) to polystyrene-poly(ethylene-butylene)-polystyrene triblock copolymer is 3 to 5.

* * * * *